(12) United States Patent
Landrieve

(10) Patent No.: US 7,059,775 B2
(45) Date of Patent: Jun. 13, 2006

(54) ROLLER DEVICE WITH INSTRUMENTED BALL BEARING

(75) Inventor: Franck Landrieve, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 130 days.

(21) Appl. No.: 10/471,004

(22) PCT Filed: Mar. 1, 2002

(86) PCT No.: PCT/FR02/00739

§ 371 (c)(1),
(2), (4) Date: Feb. 23, 2004

(87) PCT Pub. No.: WO02/071076

PCT Pub. Date: Sep. 12, 2002

(65) Prior Publication Data

US 2004/0120620 A1    Jun. 24, 2004

(30) Foreign Application Priority Data

Mar. 6, 2001 (FR) .................................. 01 03043

(51) Int. Cl.
*F16C 19/06* (2006.01)
(52) U.S. Cl. ...................................... 384/448; 384/449
(58) Field of Classification Search ................ 384/448, 384/449, 446, 537, 544
See application file for complete search history.

(56) References Cited

U.S. PATENT DOCUMENTS 4,986,605 A    1/1991    Descombes

FOREIGN PATENT DOCUMENTS

DE    44 12 307    10/1995
EP    0 326 454    8/1989

*Primary Examiner*—Lenard A. Footland
(74) *Attorney, Agent, or Firm*—Young & Thompson

(57) ABSTRACT

A roller device with instrumented ball bearing of the type supported by a non-rotating element and provided with a sensor of rotational parameters, characterized in that the ball bearing (2) and the sensor elements (4) are rigidly mounted on a fixing element (3) adapted to co-operate with another mechanical member for fixing the device.

12 Claims, 5 Drawing Sheets

FIG_1
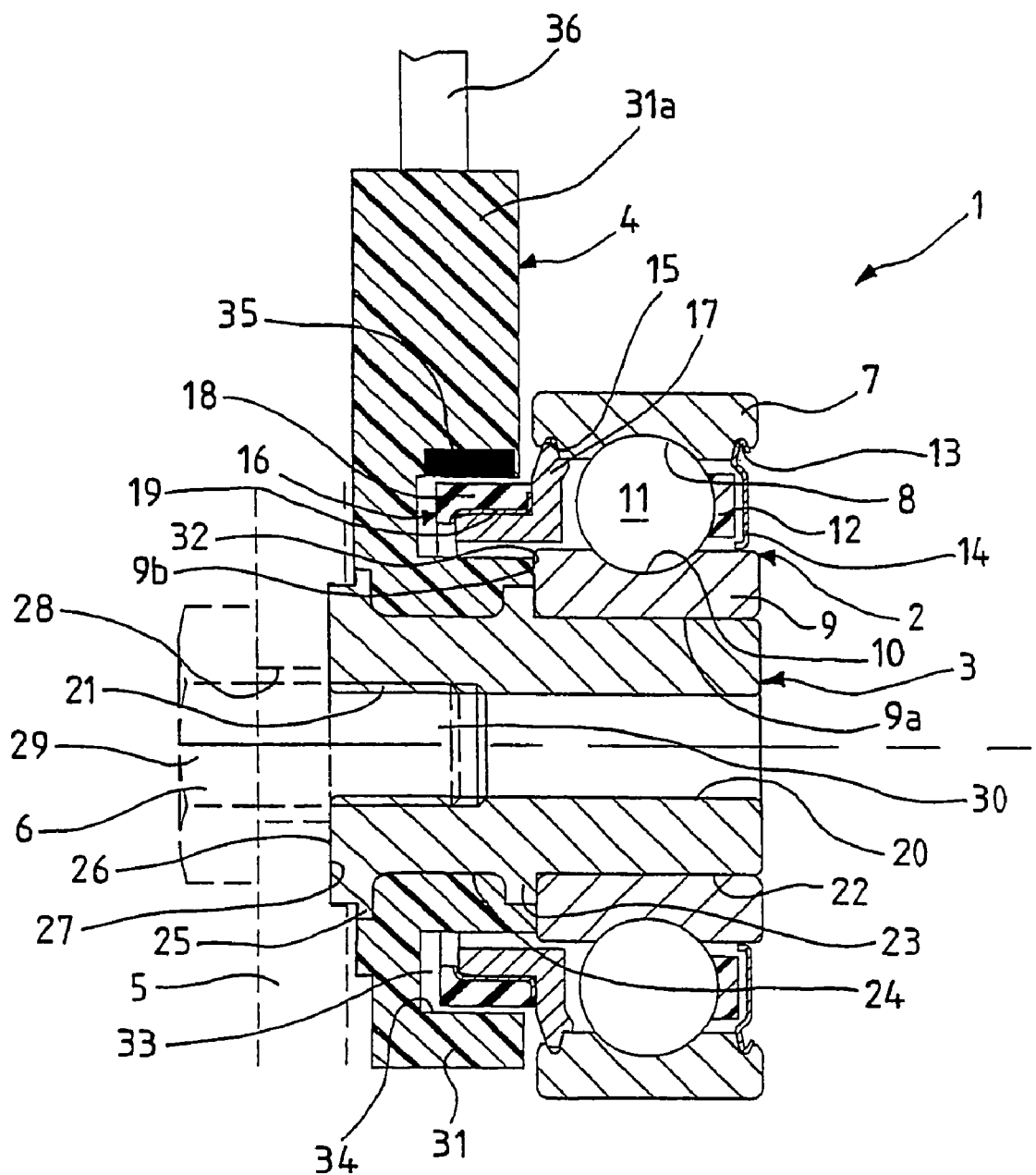

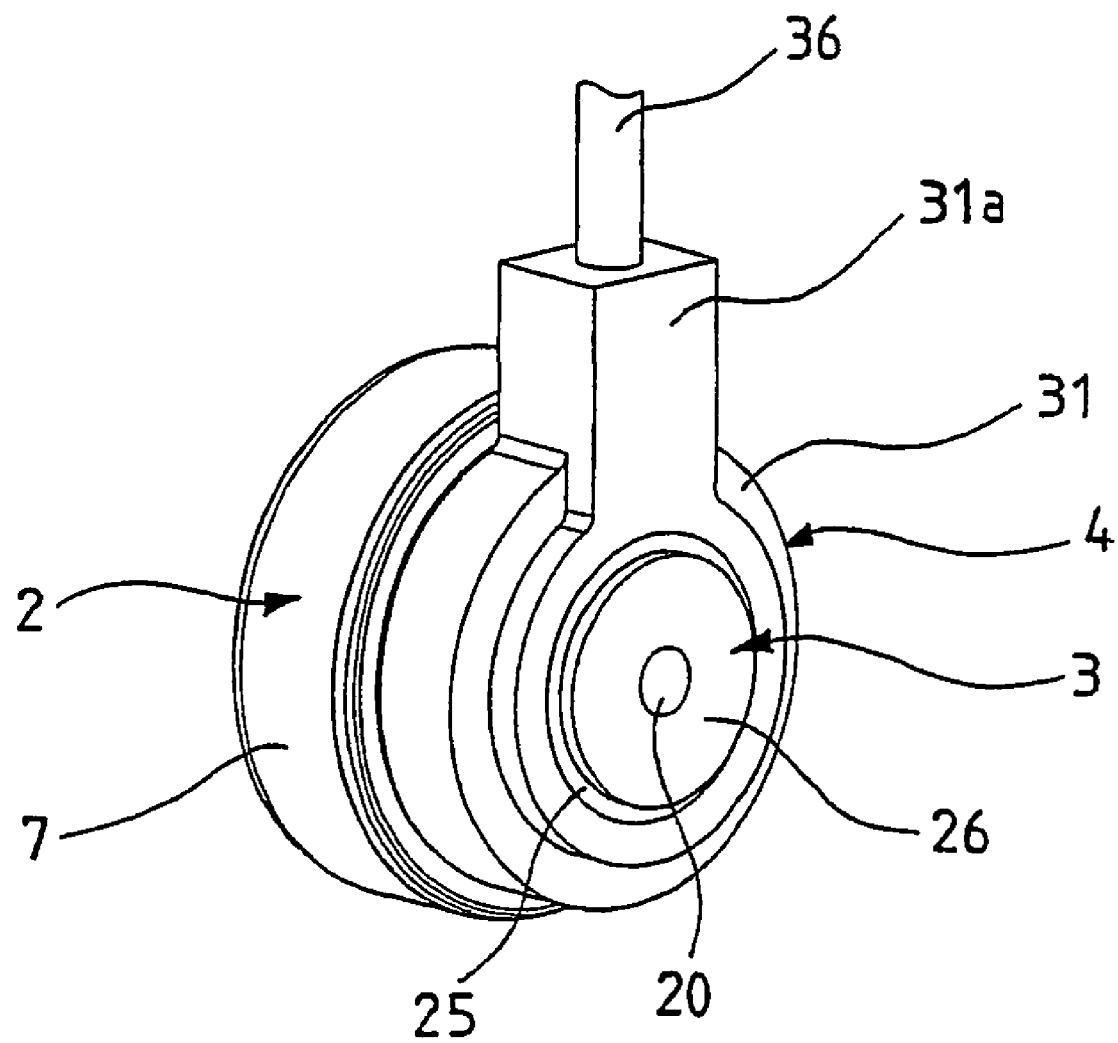
FIG_2

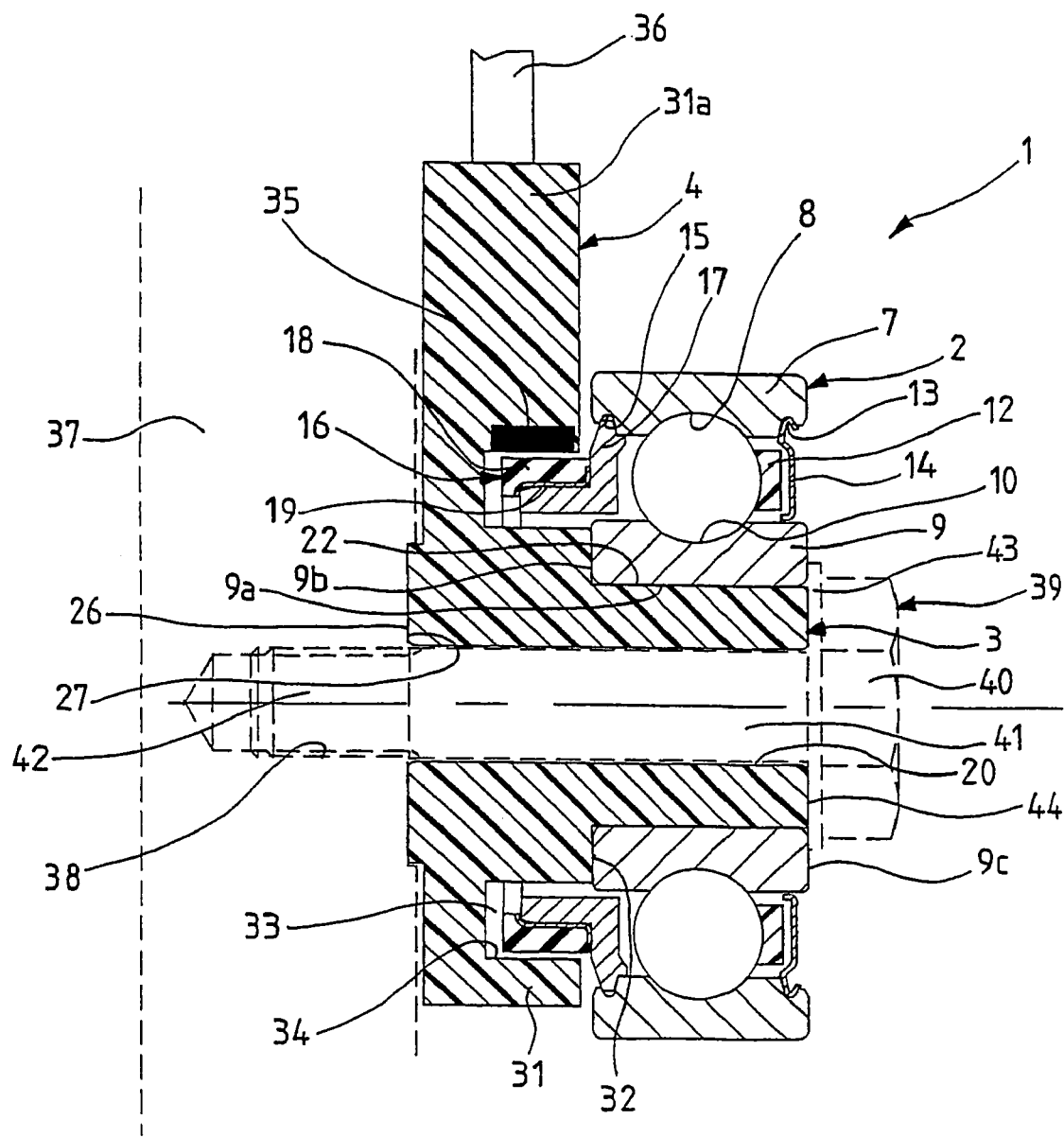
FIG_3

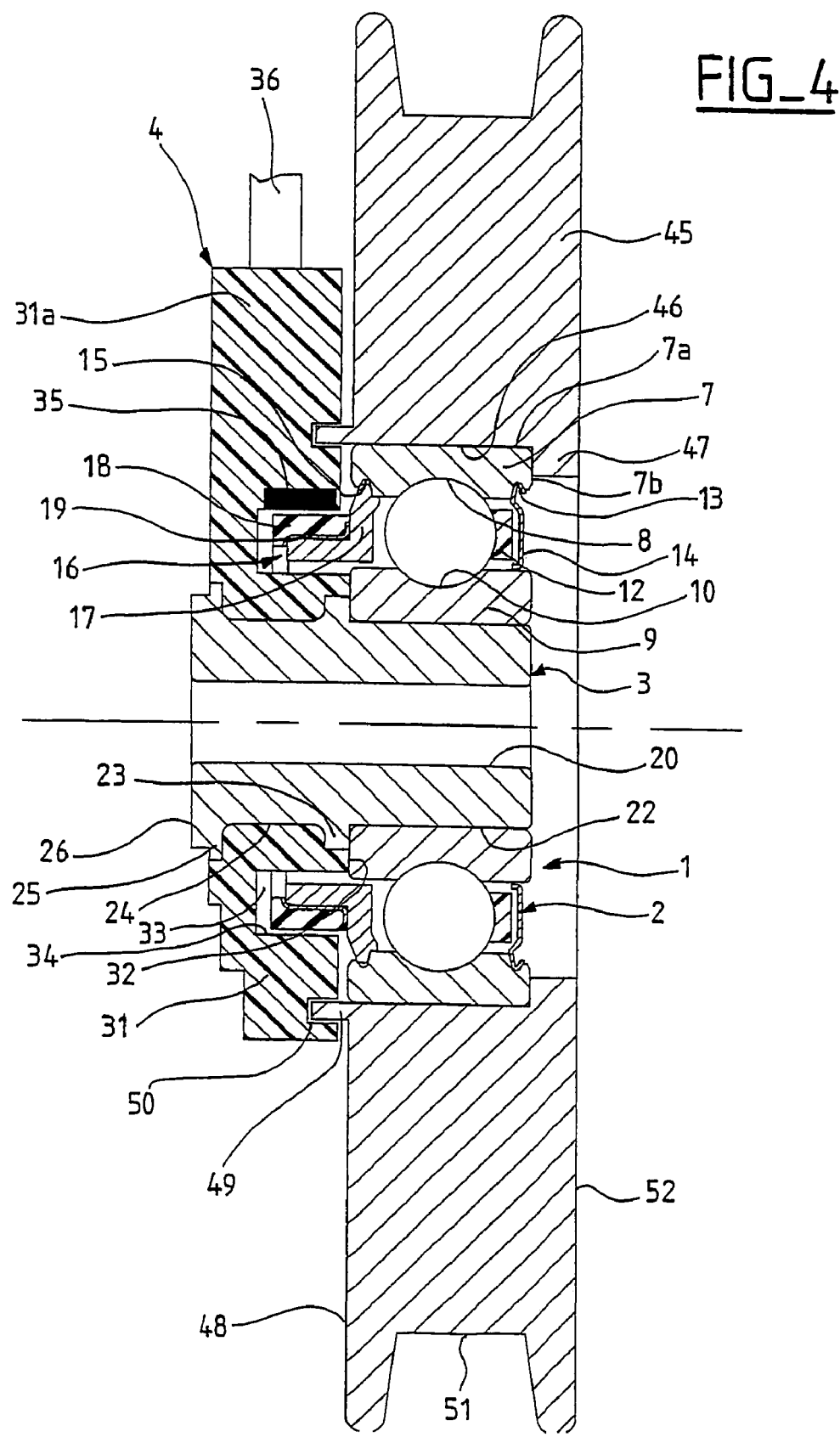
FIG_4

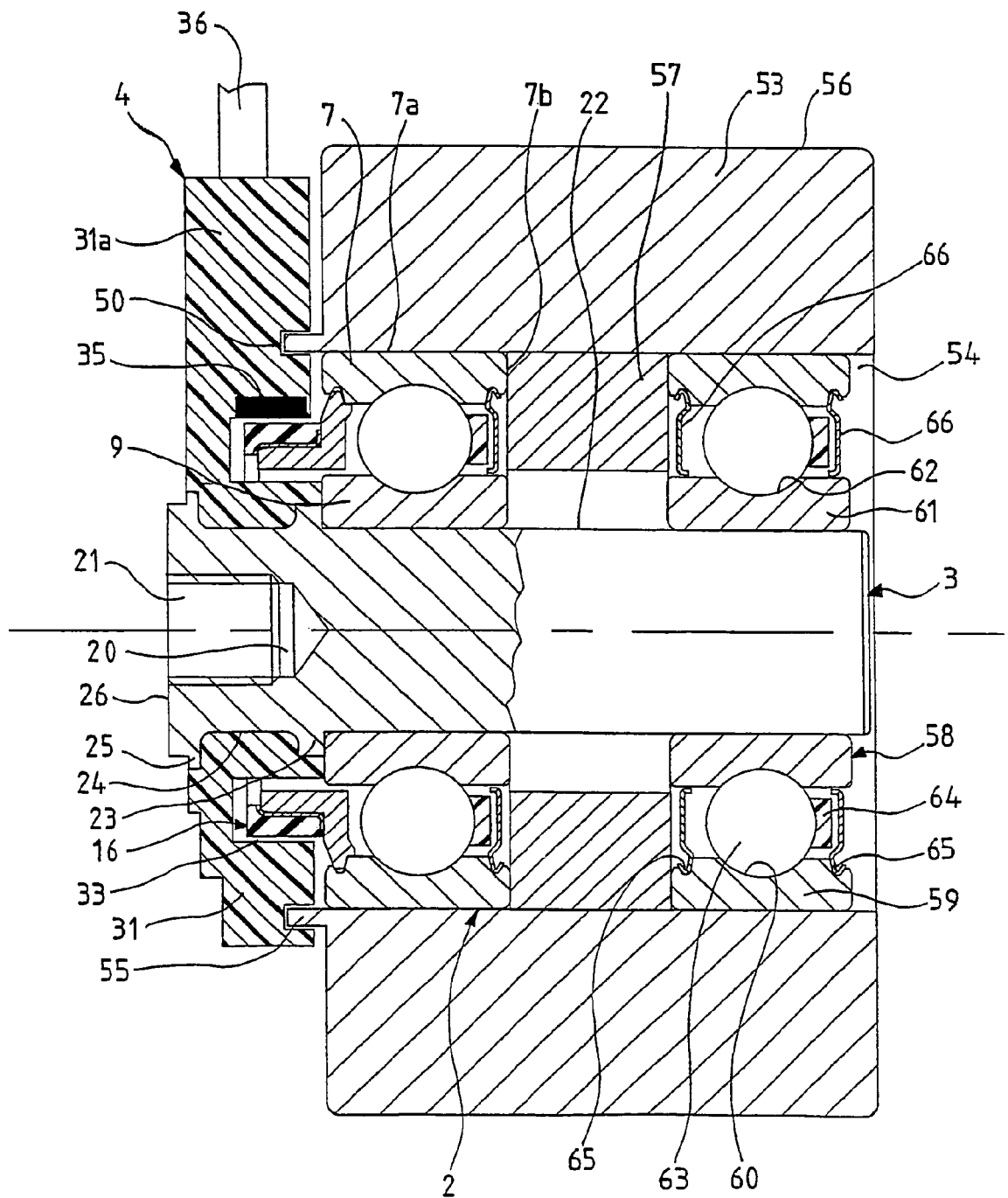
FIG_5

ROLLER DEVICE WITH INSTRUMENTED BALL BEARING

The present invention relates to the field of rolling bearing assemblies, particularly those designed for rollers or pulleys comprising a fixed part intended to be mounted on a support or a frame, and a rotating part intended to come into contact with an external element such as a belt, a rail, a drum, etc. Said external element drives the rotation of the rotating part which is mounted so that it can rotate freely on the fixed part.

Rollers may be used in many applications. Thus, one finds belt-tensioning rollers intended constantly to exert a tensile force on a belt. The rotating part in contact with the belt consists of the outer ring of a bearing or of a pulley mounted on said outer ring.

Rollers may also be used as guide members for guiding elevator doors or escalator handrails.

Increasingly, the operation of moving mechanical assemblies is controlled by electronic systems, and this assumes that the necessary information about the moving members, particularly the movement, speed, acceleration, etc. thereof is permanently available.

If a roller is equipped with a device for detecting rotation parameters, then information about the angular or linear movements of the elements in contact with the rotating part of the roller can be deduced from this. For example, if the roller bears against an escalator handrail, then it is possible, via the roller, to determine the linear speed of the handrail. Likewise, by instrumenting elevator door rollers, it is possible to obtain information about the linear movement of the doors, such as the speed, the acceleration or the travel.

In devices of the prior art, the detection systems with which the rollers were equipped were attached to existing rollers and required complex and often expensive adaptations.

Document FR-A-2 626 631 describes a rolling bearing assembly setup with a sensor device which has significant axial bulk and contains a high number of parts, especially special-purpose parts.

The invention proposes to remedy the disadvantages of the prior art.

The invention proposes a preassembled instrumented roller module that the end-user now need merely mount very simply on a support.

The roller device with instrumented rolling bearing, according to one aspect of the invention, is of the type supported by a non-rotating element and provided with a sensor means for sensing rotation parameters and with an encoder means. The bearing and the sensor means are mounted rigidly on a fixing element able to collaborate with another mechanical member with a view to fixing the device. The fixing element comprises means of securing to said other mechanical member, these means being provided in a central position. The encoder means is fixed directly to the bearing.

Various sizes may be anticipated to cover a wide range of applications. Because of the compactness and simplicity of the instrumented rollers, the same size will be suitable for many applications.

Advantageously, the fixing element has a cylindrical outer surface in contact with the bore of an inner ring of the rolling bearing.

In one embodiment of the invention, the rolling bearing comprises an inner ring, an outer ring, a row of rolling elements, for example balls, arranged between the inner and outer rings, and a cage for maintaining the circumferential spacing of the rolling elements. Furthermore, a seal or sealing flange may be fixed on one of the rings and extend into the proximity of or into contact with the other ring.

Advantageously, the sensor means comprises an annular support body and at least one sensor element. The body is arranged in contact with a lateral face of the rolling bearing.

In one embodiment of the invention, the fixing element comprises a central through-hole able to take a screw. The sleeve tube may be arranged in the bore of the inner ring.

In one embodiment of the invention, the sleeve tube comprises an outer second surface in contact with an inner surface of the sensor means, for example of its support body, and a radial surface in contact with a radial surface of the inner ring of the rolling bearing. The sleeve tube and the rolling bearing can thus be positioned axially.

In one embodiment of the invention, the fixing element comprises a means for axially holding the support body. This holding means is preferably rigid.

In one embodiment of the invention, the sleeve tube is provided with a plain or threaded bore for fixing the device to another mechanical member. The sleeve tube is thus able to collaborate with a screw passing through it and which collaborates with a threaded bore of said other mechanical member or collaborates with the screw threads formed in the bore of the sleeve tube.

In one embodiment of the invention, the fixing element and the support body form one single piece which may advantageously be made of a rigid synthetic material, for example a fiber-filled material.

In another embodiment of the invention, the fixing element and the support body form distinct parts.

Advantageously, the support body is provided with a radial lateral surface in which there is formed an annular slot comprising a cylindrical outer surface, the sensor element lying flush with said cylindrical outer surface.

In one embodiment of the invention, the device comprises an encoder means provided with a support and with an active part, the active part projecting from a lateral face of the rolling bearing, the support being fixed directly to the bearing. The active part is arranged radially at the rolling elements.

In one embodiment of the invention, the encoder means and the sensor means are mounted in close proximity to a lateral face of the rolling bearing. The device is thus axially very compact.

In one embodiment of the invention, the fixing element comprises a radial surface for mounting on a support, the encoder means being arranged axially between said radial mounting surface and the rolling bearing. The encoder means is thus well protected and prevented from projecting axially from the pulley or the bearing.

The fixing element may be provided with a threaded axial portion projecting from the radial mounting surface.

In one embodiment of the invention, the device comprises an additional rolling bearing mounted on the fixing element. This is well suited to large rollers and/or rollers subjected to heavy loads and/or highly inclined forces. A spacer piece may be arranged between the bearings, at their inner rings or their outer rings. The spacer piece may be a separate element or be incorporated into the pulley or into the fixing element. As a preference, the additional rolling bearing is of the uninstrumented type.

The present invention will be better understood and other advantages will become apparent from reading the detailed description of a few embodiments taken by way of nonlimiting examples and illustrated by the appended drawings, in which:

FIG. 1 is a view in axial section of a rolling bearing assembly mounted on a frame;

FIG. 2 is a view in perspective of the rolling bearing assembly of figure 1, not mounted on the frame;

FIG. 3 is an alternative form of figure 1;

FIG. 4 is a view in axial section of a rolling bearing assembly equipped with a pulley; and FIG. 5 is a view of another embodiment.

As can be seen in FIG. 1, the instrumented rolling bearing assembly referenced 1 in its entirety comprises a rolling bearing 2, a fixing element 3 and a sensor assembly 4. The bearing assembly 1 is mounted on a support 5 by means of a screw 6.

The rolling bearing 2 comprises a rotating outer ring 7 provided with a raceway 8 on its bore, an inner ring 9 provided with a raceway 10 on its outer surface, a row of rolling elements 11, in this case balls, arranged between the raceways 8 and 10 of the outer 7 and inner 9 rings, and a cage 12 for maintaining the circumferential spacing of the rolling elements 11. The cage 12 may be made of synthetic material. The rings 7 and 9 of the bearing 2 are of solid type, produced by machining, but could also be made of pressed sheet metal. The outer ring 7 is provided, on its bore, near one of its lateral surfaces, with an annular slot 13. A sealing flange 14 is mounted in the slot 13 and has a free end extending as far as the vicinity of the outer cylindrical surface of the inner ring 9.

In the embodiment depicted, the outer ring 7 rotates and the inner ring 9 does not. However, the reverse arrangement could perfectly well be anticipated.

A slot 15 is formed in the outer ring 7 symmetrically to the slot 13 with respect to a plane passing through the center of the rolling elements 11.

An encoder assembly 16 is mounted secured to the outer ring 7. The encoder assembly 16 comprises a support 17 of annular shape with an L-shaped cross section with a radial part the free end of which is mounted in the slot 15 and a tubular part running from the inner end of the radial part away from the rolling elements 11, in other words toward the outside of the rolling bearing 2. The support 17 may [lacuna] made of metal, for example of light alloy, and be push-fitted onto the outer ring 7.

The encoder assembly 16 further comprises an active part 18 mounted on the outer surface of the tubular part of the support 17 and formed, for example, in elastoferrite, that is to say a nitrile-based mixture containing magnetized ferrite particles. A skeleton 19, for example made of thin sheet metal, supports the active part 18 overmolded on top of it. The skeleton 19 is push-fitted onto the tubular part of the support 17. The encoder assembly 16 projects axially from the bearing 2 toward the support 5.

The fixing element 3 is of annular overall shape, here in the form of a sleeve tube. The fixing element 3 comprises a bore 20 provided with a threaded portion 21 at one of its ends, and an outer surface having a first cylindrical portion 22 arranged axially on the opposite side to the threaded portion 21 of the bore 10, then an annular rib 23, then a second cylindrical portion 24, then an annular rib 25 arranged axially on the same side as the threaded portion 21 of the bore 20. The two ends of the bore 20 are open.

The fixing element 3 is mounted in the bore 9a of the inner ring 9 of the bearing 2 with the first cylindrical portion 22 in contact with the bore 9a and the rib 23 in contact with a radial surface 9b of the inner ring 9. Provision may be made for the inner ring 9 and the fixing element 3 to be mounted as a fairly tight fit, so that they are held together by push-fitting.

Finally, the fixing element 3 is provided with a radial end surface 26 on the same side as the threaded portion 21 of the bore 20. The radial surface 26, axially offset outward with respect to the support body, is in contact with a disk-shaped surface 27 belonging to the support 5, formed as a slight hollowing with respect to the rest of the support 5, so that the fixing element 3 is positioned radially with respect to said support 5. The support 5 is provided with a through-hole 28 aligned with the bore 20 and with a diameter greater than or equal to the latter. The screw 6 is provided with a head 29 arranged in contact with the support 5 on the opposite side to the bearing assembly 1 and with a body 30 with a threaded outer surface passing through the hole 28 and engaging with the threaded portion 21 of the bore 20 of the fixing element 3.

The sensor assembly 4 comprises a support body 31, for example made of synthetic material, having an annular overall shape with an inner surface coming into contact with the second cylindrical portion 24 and the ribs 23 and 25 of the fixing element 3. The support body 31 is a shape match for said cylindrical portion 24 and said ribs 23 and 25, guaranteeing the relative axial positioning of the fixing element 3 and of the encoder assembly 4.

The support body 31 is provided with a radial surface 32 in contact with the radial surface 9b of the inner ring 9. An annular slot 33 is formed in said support body 31 from the radial surface 32 and is therefore open toward the bearing 3, so that it can house the part of the encoder assembly 16 which projects axially from the radial surface 9b of the inner ring 9. The slot 33 is provided with a cylindrical outer surface 34. A sensor element 35 is mounted semiembedded in the support body 31 and lies flush with the cylindrical surface 34, so that it is mounted facing the active part 18 of the encoder assembly 15 and with a small radial gap from said active part 18. The sensor element 35 is of the magnetically sensitive type, for example a Hall-effect probe. The sensor element 35 and the active part 18 of the encoder assembly 16 are arranged a very small axial distance away from the rolling bearing 2, particularly from the radial surface 9b of the inner ring 9, which gives excellent compactness.

The support body 31 thus extends radially outward from the fixing element 3.

Furthermore, the support body 31 is provided with a radial outgrowth 31a located circumferentially and forming a cable outlet for a cable 36 able to communicate an electrical signal from the sensor element 35 to other elements, not depicted, for example an electronic processing unit. The axial length of the support body 31 is designed such that a small space remains between the support 5 and said body 31. This then avoids deformation of said support body 31.

It will be understood that the rolling bearing 2, the fixing element 3 and the sensor assembly 4 form an instrumented bearing assembly unit without the risk of parts being lost and able to be mounted in a simple and economical way on a support.

In the embodiment of FIG. 3, the fixing element and the support body are made in one piece of synthetic material, for example fiber-filled material. The bore 20 of the fixing element is plain. The rolling bearing assembly 1 is mounted on a support 37 thicker than the support 5 of the previous embodiment. The support 37 is provided with a threaded non-emerging hole 38. A screw 39 has a head 40, an unthreaded body part 41 and a threaded end 42. The unthreaded body portion passes through the bore 20. The head 40 is in contact via a washer 43 with the radial annular surface 44 of the fixing element 3 and with the radial annular surface 9c of the inner ring 9 of the bearing 2 which is the opposite surface to the radial annular surface 9b. The surfaces 9c and 44 are coplanar. The threaded end 42 of the screw 40 is screwed into the hole 38.

This embodiment has the advantage of an extremely low number of parts and of ease of attachment.

The embodiment illustrated in FIG. 4 is similar to that of FIG. 1 except that a pulley 45 is fixed to the outer ring 7 of the bearing 2. More specifically, the pulley 45, of annular shape, has a bore 46 one axial end of which has an annular rib 47 projecting inward. The bore 46 is push-fitted onto the cylindrical outer surface 7a of the outer ring, while the rib 47 butts against the radial surface 7b of the outer ring 7, on the side where the sealing flange 14 is. On the opposite side, the pulley 45 has a radial surface 48 roughly aligned with the radial end surface 9b of the inner ring 9 and the corresponding surface of the outer ring 7 and which leaves a certain axial space with respect to the support body 31.

The pulley 45 comprises an annular rib 49 projecting axially from the side of the support body 31 and arranged radially near the outer ring 7 of the bearing 2. The rib 49 may be aligned with the bore 46 of the pulley 45. The rib 49 projects into a corresponding slot 50 formed in the radial surface 32 of the support body 31. The rib 49 and the slot 50 form a chicane providing sealing because of the narrow passage. Sealing that the encoder and the bearing enjoy is thus improved.

The pulley 45 is provided on its cylindrical outer surface with a groove 51 able to collaborate with a vee belt. The radial surface 52 of the pulley 45 on the opposite side to the radial surface 48 projects axially with respect to the radial surface 9c of the inner ring 9 and with respect to the radial surface 7b of the outer ring 7. It is thus possible to make the head of a screw arranged in the bore 20 of the fixing element 3 and arranged in the same direction as the screw 40 of the embodiment of FIG. 2 lie flush with said radial surface 52 of the pulley 45 or be set back slightly therefrom, avoiding the creation of roughnesses.

The pulley 45 may be push-fitted onto the outer ring 7 of the rolling bearing 2 and/or bonded.

In the embodiment illustrated in FIG. 5, the roller with a rolling bearing comprises a rolling bearing 2 identical to the one illustrated in FIG. 1, a fixing element 3, a sensor assembly 4 similar to the one illustrated in FIG. 1, a pulley 53 and an additional rolling bearing 58. The fixing element 3 is similar to the one illustrated in FIG. 1 except that it is provided with a blind axial hole 20 provided with a threaded portion 21 and that the first cylindrical portion 22 of its outer surface is extended away from the blind hole 20. The fixing element 3 is therefore in the form of an axle provided with a blind hole threaded at one of its axial ends.

The pulley 53 comprises a bore 54 in contact with the cylindrical outer surface 7a of the outer ring 7 of the bearing 2, a cylindrical outer surface 56 with which a belt or the equivalent can come into contact, and an annular axial outgrowth 55 lying in the continuation of the bore 54 and projecting from the frontal radial surface of the pulley 53 adjacent to the sensor assembly 4. The annular axial outgrowth 55 projects axially into a corresponding annular slot 50 in the support body 31.

The spacer piece 57 is of annular shape of parallelepipedal cross section, having a cylindrical outer surface in contact with the bore 54 of the pulley 53, a radial surface in contact with the radial surface 7b of the outer ring 7 of the bearing 2 and an opposite radial surface, and a bore, having a diameter greater than that of the cylindrical portion portion 22 of the fixing element 3. The diameter of the bore of the spacer piece 57 is roughly equal to the diameter of the outer cylindrical bearing surface of the inner ring 9 of the bearing 2 and may thus contribute to sealing said bearing 2 by forming a narrow passage with said inner ring 9.

The rolling bearing 58 comprises a rotating outer ring 59 provided with a raceway 60 on its bore, an inner ring 61 provided with a raceway 62 on its outer surface, a row of rolling elements 63, in this case balls, arranged between the raceways 60 and 62 of the outer 59 and inner 61 rings, and a cage 54 for maintaining the circumferential spacing of the rolling elements 63. The cage 64 may be made of synthetic material or of sheet metal. The rings 59 and 61 of the bearing 58 are of solid type, produced by machining, but could just as well be made of pressed sheet metal. The outer ring 59 is provided, on its bore, on each side of the raceway 60, near its radial lateral surfaces, with annular slots 65. Sealing flanges 66 are mounted in the slots 65 and each have a free end extending as far as the vicinity of the outer cylindrical surface of the inner ring 61.

The cylindrical outer surface of the outer ring 59 is in contact with the bore 54 of the pulley 56, for example as a tight fit. One of the radial lateral surfaces of the outer ring 59 is in contact with the spacer piece 57 on the opposite side to the bearing 2. The inner ring 61 is mounted on the cylindrical portion 22 of the fixing element 3, for example as a tight fit. The axial end of the fixing element 3 projects very slightly from the lateral surface of the bearing 58 on the opposite side to the bearing 2, while the axial end of the pulley 53 projects slightly from this same lateral surface of the bearing 58.

This embodiment is particularly well suited to applications requiring a very wide pulley and which generally are characterized by relatively highly inclined torques. Furthermore, the presence of two rolling bearings in the roller makes it possible to withstand high radial loads. The roller with rolling bearing may be fixed as in the other embodiments via the fixing element 3, for example using a screw engaging in the threaded hole 20. For reasons of economics, the rolling bearing 58 may be of conventional type, that is to say one acting simply as a bearing.

It would be possible, without departing from the scope of the invention, to anticipate for the fixing element not to have a plain or threaded hole in its central part, but for it to be provided, at its end intended to be mounted on a support, with a threaded axial part arranged along the axis of the device projecting from the radial mounting surface. Said threaded axial part can collaborate with a threaded hole in the support or with a nut.

It will be understood that the sensor support body and the inner ring of the rolling bearing are connected rigidly to the fixing element and that there can be no relative movement between these two parts.

Thus, in a simple and economical way, there is obtained an instrumented roller that is extremely compact, that the user need merely install simply using a screw or a nut and a bolt. All that is then required for the device to become operational is for the roller to be connected to a signal processing device.

The invention claimed is:

1. A roller device with rolling bearing of the instrumented type supported by a non-rotating element and provided with a sensor means for sensing rotation parameters and with an encoder means, wherein, the bearing and the sensor means are mounted rigidly on one and the same fixing element able to collaborate with another mechanical member with a view to fixing the device, said fixing element comprising means of securing to said other mechanical member in a central position, and the encoder means is fixed directly to the bearing.

2. The device as claimed in claim 1, wherein, the fixing element has a cylindrical outer surface in contact with the bore of an inner ring of the rolling bearing.

3. The device as claimed in claim 2, wherein, the sensor means comprises an annular support body and at least one sensor element, said body being arranged in contact with a lateral face of the rolling bearing.

4. The device as claimed in claim 1, wherein, the fixing element comprises a central through-hole able to take a screw.

5. The device as claimed in claim 4, wherein, the sleeve tube comprises an outer second surface in contact with an inner surface of the sensor means and a radial surface in contact with a radial surface of the inner ring of the rolling bearing.

6. The device as claimed in claim 5, wherein, the fixing element is provided with a plain or threaded bore for fixing the device to another mechanical member.

7. The device as claimed in claim 4, wherein, the fixing element is provided with a plain or threaded bore for fixing the device to another mechanical member.

8. The device as claimed in claim 1, wherein, the sensor means comprises an annular support body and at least one sensor element, said body being arranged in contact with a lateral face of the rolling bearing.

9. The device as claimed in claim 1, wherein, the encoder means is provided with a support and with an active part, the active part projecting from a lateral face of the rolling bearing, the support being fixed directly to the bearing, the active part being arranged radially at the rolling elements.

10. The device as claimed in claim 1, wherein, the encoder means and the sensor means are mounted in close proximity to a lateral face of the rolling bearing.

11. The device as claimed in claim 1, wherein, the fixing element comprises a radial surface for mounting on a support, the encoder means being arranged axially between said radial mounting surface and the rolling bearing.

12. The device as claimed in claim 1, wherein, the support body is provided with a radial lateral surface in which there is formed an annular slot comprising a cylindrical outer surface, the sensor element lying flush with said cylindrical outer surface.

* * * * *